(12) United States Patent
Ishikawa et al.

(10) Patent No.: US 8,688,918 B2
(45) Date of Patent: Apr. 1, 2014

(54) PROGRAM CONVERTING APPARATUS, PROGRAM CONVERTING METHOD, AND MEDIUM

(75) Inventors: Yuji Ishikawa, Tokyo (JP); Akira Kuroda, Kanagawa (JP); Hidenori Matsuzaki, Tokyo (JP); Nobuaki Tojo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 182 days.

(21) Appl. No.: 13/422,054

(22) Filed: Mar. 16, 2012

(65) Prior Publication Data

US 2013/0117512 A1    May 9, 2013

(30) Foreign Application Priority Data

Nov. 9, 2011 (JP) ................................. 2011-245813

(51) Int. Cl.
*G06F 12/00* (2006.01)
(52) U.S. Cl.
USPC ......................................................... 711/141
(58) Field of Classification Search
None
See application file for complete search history.

(56) References Cited

U.S. PATENT DOCUMENTS

| 6,609,088 | B1 | 8/2003 | Wuytack et al. |
| 7,856,629 | B2* | 12/2010 | Michimoto et al. ........... 717/160 |
| 2007/0174829 | A1 | 7/2007 | Brockmeyer et al. |
| 2012/0042304 | A1 | 2/2012 | Tojo et al. |
| 2012/0079467 | A1* | 3/2012 | Tojo et al. ..................... 717/150 |

FOREIGN PATENT DOCUMENTS

| JP | 05-061770 | 3/1993 |
| JP | 2007-156821 | 6/2007 |
| JP | 2007-207224 | 8/2007 |

* cited by examiner

*Primary Examiner* — Hiep Nguyen
(74) *Attorney, Agent, or Firm* — White & Case LLP

(57) ABSTRACT

According to one embodiment, a program converting device includes an access attribute determining unit, a non-sharing target classifying unit, and a converting unit. The access attribute determining unit calculates exclusive accesses from memory accesses by threads forming a source program and determines a memory access using a cache memory among the calculated exclusive accesses. The non-sharing target classifying unit determines an access data item that does not share a cache line with another access data item among the access data items that are accessed using the cache memories. The converting unit inserts a process that does not share the cache line into the source program based on the determination result of the non-sharing target classifying unit.

20 Claims, 21 Drawing Sheets

```
int array0[10];
char char0;

void main(){
    thread_0();
    SYNC(thread_0);
    thread_1();
    thread_2();
}
thread_0(){
    int i;
    for(i=0; i<10; i++){
        READ(array0[i]);
        WRITE (array0[i]);
    }
}
thread_1(){
    int j;
    for(j=0; j<10; j++){
        WRITE (array0[j]);
    }
}
thread_2(){
    WRITE(char0);
}
```

FIG.12A

```
int array0[10];
char char0;

void main(){        ;2071
    UNSHARED(array0);
    thread_0();
    SYNC(thread_0);
    thread_1();
    thread_2();
}
thread_0(){
    int i;
    for(i=0; i<10; i++){
        READ(array0[i]);
        WRITE (array0[i]);
    }
}
thread_1(){
    int j;
    for(j=0; j<10; j++){
        WRITE (array0[j]);
    }
}
thread_2(){
    WRITE(char0);
}
```

FIG.12B

```
                          ⟨207
int array0[10];
char char0;

void main(){        ⟨2072
   #pragma unshared array0
   thread_0();
   SYNC(thread_0);
   thread_1();
   thread_2();
}
thread_0(){
   int i;
   for(i=0; i<10; i++){
     READ(array0[i]);
     WRITE (array0[i]);
   }
}
thread_1(){
   int j;
   for(j=0; j<10; j++){
     WRITE (array0[j]);
   }
}
thread_2(){
   WRITE(char0);
}
```

FIG.12C

```
                                 ⌠207
int array0[10];
char char0;

void main(){      ⌠2073
  ┌─────────────────┐
  │ array0.unshared(); │
  └─────────────────┘
   thread_0();
   SYNC(thread_0);
   thread_1();
   thread_2();
}
thread_0(){
   int i;
   for(i=0; i<10; i++){
     READ(array0[i]);
     WRITE (array0[i]);
   }
}
thread_1(){
   int j;
   for(j=0; j<10; j++){
     WRITE (array0[j]);
   }
}
thread_2(){
   WRITE(char0);
}
```

FIG.12D

```
                                  ,207
  int array0[10];
  char char0;

void main(){         ,2074
    ┌─────────────────────────────┐
    │ unshared *unshared_list[1]; │
    │ unshared_list[0] = array0;  │
    └─────────────────────────────┘
    thread_0();
    SYNC(thread_0);
    thread_1();
    thread_2();
  }
  thread_0(){
    int i;
    for(i=0; i<10; i++){
      READ(array0[i]);
      WRITE (array0[i]);
    }
  }
  thread_1(){
    int j;
    for(j=0; j<10; j++){
      WRITE (array0[j]);
    }
  }
  thread_2(){
    WRITE(char0);
  }
```

FIG.13A

```
int array0[10];
char char0;

void main(){           ⌐2071
    UNSHARED(array0);
    thread_0();
    SYNC(thread_0);
    thread_1();
    thread_2();
}
thread_0(){
    int i;
    PRIVATE(array0);
    for(i=0; i<10; i++){
        READ(array0[i]);
        WRITE (array0[i]);
    }
    PUBLIC(array0);
}
thread_1(){
    int j;
    PRIVATE(array0);
    for(j=0; j<10; j++){
        WRITE (array0[j]);
    }
    PUBLIC(array0);
}
thread_2(){
    WRITE(char0);
}
```

```
int array0[10];
char char0;

void main(){          ;2072
  #pragma unshared array0
  thread_0();
  SYNC(thread_0);
  thread_1();
  thread_2();
}
thread_0(){
  int i;
  #pragma private array0
  for(i=0; i<10; i++){
    READ(array0[i]);
    WRITE (array0[i]);
  }
  #pragma public array0
}
thread_1(){
  int j;
  #pragma private array0
  for(j=0; j<10; j++){
    WRITE (array0[j]);
  }
  #pragma public array0
}
thread_2(){
  WRITE(char0);
}
```

```
                                        ⟨203
int array0[10];
char char0;

void main(){    ⟨2073
   array0.unshared();
   thread_0();
   SYNC(thread_0);
   thread_1();
   thread_2();
}
thread_0(){
   int i;
   array0.private();
   for(i=0; i<10; i++){
      READ(array0[i]);
      WRITE (array0[i]);
   }
   array0.public();
}
thread_1(){
   int j;
   array0.private();
   for(j=0; j<10; j++){
      WRITE (array0[j]);
   }
   array0.public();
}
thread_2(){
   WRITE(char0);
}
```

```
                                            ‹203
  pubic int array0[10];
  char char0;

void main(){          ‹ 2074
    unshared *unshared_list[1];
    unshared_list[0] = array0;
    thread_0();
    SYNC(thread_0);
    thread_1();                      ‹2034
    thread_2();
  }
  thread_0(){
    int i;
    private int *private_array0;
    private_array0 = array;
    for(i=0; i<10; i++){
      READ(private_array0[i]);
      WRITE (private_array0[i]);
    }
    array0 = private_array0;
  }
  thread_1(){
    int j;
    private int *private_array0;
    private_array0 = array;
    for(j=0; j<10; j++){
      WRITE (private_array0[j]);
    }
    array0 = private_array0;
  }
  thread_2(){
    WRITE(char0);
  }
```

```
int array[10];
char char0;
char char1;
void main(){
   thread_0();
   SYNC(thread_0);
   thread_1();
   thread_2();
}
thread_0(){
   int i;
   for(i=0; i<10; i++){
     READ(array0[i]);
   }
}
thread_1(){
   int j;
   for(j=0; j<10; j++){
     READ(array0[j]);
   }
   WRITE(char1);
}
thread_2(){
   WRITE(char0);
}
```

```
                                        ₍202
┌─────────────────────────────────┐
│ thread_0  array0 10 Read        │
│ thread_1  array0 10 Read        │
│ thread_1  char1  1 Write        │
│ thread_2  char0  1 Write        │
│                                 │
└─────────────────────────────────┘
```

FIG.17

| THREADS WHICH ARE EXECUTED IN PARALLEL (thread_0) | ACCESS UNIT DATA ITEM WHICH IS ACCESSED BY thread_0 (array0, 0, 10, Read) |
|---|---|
| THREADS WHICH ARE EXECUTED IN PARALLEL (thread_1、thread_2) | ACCESS UNIT DATA ITEM WHICH IS ACCESSED BY thread_1 (array0, 0, 10, Read) (char1, Write) |
|  | ACCESS UNIT DATA ITEM WHICH IS ACCESSED BY thread_2 (char0, Write) |

FIG.19

205 thread_0 array0 Public Read
thread_1 array0 Public Read
thread_1 char1 Private
thread_2 char0 Private
thread_0
thread_1,thread_2

FIG.21

|  | FIRST ACCESS UNIT DATA ITEM (thread_x/thread_y) | SECOND ACCESS UNIT DATA ITEM (thread_x/thread_y) | NON-SHARING |
|---|---|---|---|
| Pattern0 | Private/Private | NO ACCESS/NO ACCESS | NOT PERFORM |
| Pattern1 | Private/NO ACCESS | NO ACCESS/Public (READ-only) | NOT PERFORM |
| Pattern2 | Private/NO ACCESS | NO ACCESS/Public (WRITE) | PERFORM |
| Pattern3 | Private/NO ACCESS | NO ACCESS/Private | PERFORM |
| Pattern4 | Public/Public | Public/Public | NOT PERFORM |

FIG.22

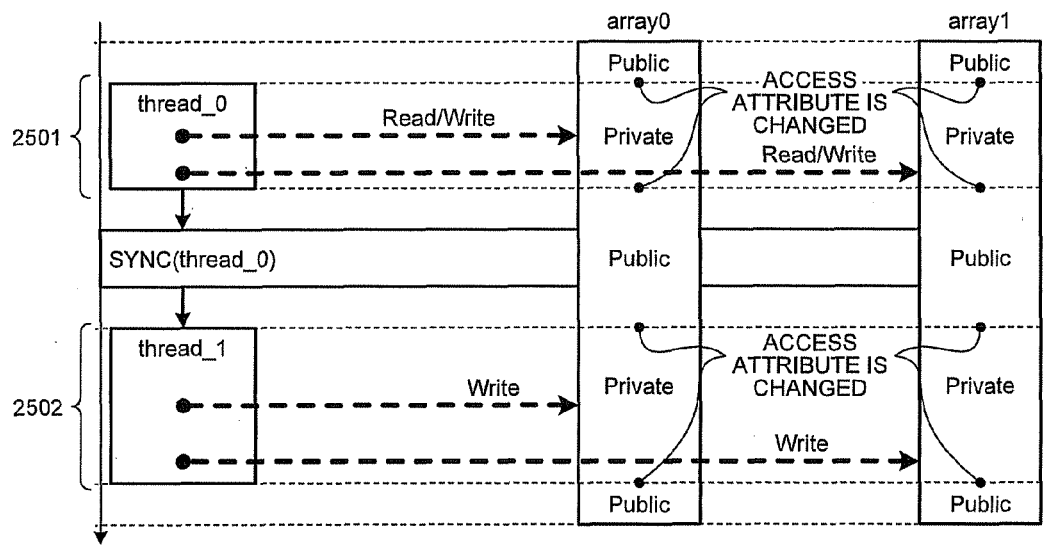

FIG.23

```
                                    ⟨201
int array0[100];
char char0;

void main(){
   thread_0();
   SYNC(thread_0);
   thread_1();
   thread_2();
}
thread_0(){
   int i;
   for(i=0; i<10; i++){
      READ(array0[i]);
      WRITE (array0[i]);
   }
}
thread_1(){
   int j;
   for(j=0; j<10; j++){
      WRITE (array0[j]);
   }
}
thread_2(){
   WRITE(char0);
}
```

US 8,688,918 B2

PROGRAM CONVERTING APPARATUS, PROGRAM CONVERTING METHOD, AND MEDIUM

CROSS-REFERENCE TO RELATED APPLICATIONS

This application is based upon and claims the benefit of priority from Japanese Patent Application No. 2011-245813, filed on Dec. 9, 2011; the entire contents of which are incorporated herein by reference.

FIELD

Embodiments described herein relate generally to a program converting apparatus, a program converting method, and a medium.

BACKGROUND

As a known technique, a technique has been proposed which stores data which is frequently accessed on a memory close to a processor in order to improve the performance of an application executed in a multi-processor environment having a hierarchical memory structure.

BRIEF DESCRIPTION OF THE DRAWINGS

FIG. 12A is a diagram illustrating an example in which a non-sharing process is described by an API scheme;
FIG. 12B is a diagram illustrating an example in which the non-sharing process is described by a scheme which makes an object have non-shared information;
FIG. 12C is a diagram illustrating an example in which the non-sharing process is described by a compiler pragma scheme;
FIG. 12D is a diagram illustrating an example in which the non-sharing process is described by a pointer scheme;
FIG. 13A is a diagram illustrating an example in which an attribute setting process is described by the API scheme;
FIG. 13B is a diagram illustrating an example in which the attribute setting process is described by the scheme which makes an object have information for designating an access attribute;
FIG. 13C is a diagram illustrating an example in which the attribute setting process is described by the compiler pragma scheme;
FIG. 13D is a diagram illustrating an example in which the attribute setting process is described by the pointer scheme;
FIG. 16 is a diagram illustrating profile information according to the second embodiment;
FIG. 17 is a diagram illustrating analysis result information according to the second embodiment;
FIG. 19 is a diagram illustrating access attribute information according to the second embodiment;
FIG. 21 is a diagram illustrating a combination which is added to a non-sharing target list and a combination which is not added to the non-sharing target list;
FIG. 22 is a diagram illustrating memory accesses in chronological order;
and
FIG. 23 is a diagram illustrating an example of a source program according to a fourth embodiment.

DETAILED DESCRIPTION

In general, according to one embodiment, a program converting apparatus includes an access attribute determining unit, a non-sharing target classifying unit, and a converting unit. The access attribute determining unit calculates exclusive accesses from memory accesses by threads forming a source program and determines a memory access using a cache memory among the calculated exclusive accesses. The non-sharing target classifying unit determines an access data item which does not share a cache line with another access data item among the access data items which are accessed using the cache memories. The converting unit inserts a process that does not share the cache line into the source program based on the determination result of the non-sharing target classifying unit.

Exemplary embodiments of a program converting apparatus, a program converting method, and a medium will be explained below in detail with reference to the accompanying drawings. The present invention is not limited to the following embodiments.

In some cases, a multi-processor architecture in which a plurality of processor cores (hereinafter, simply referred to as cores) individually include cache memories is used as the architecture of an information processing apparatus.

In the information processing apparatus, in a case in which data is stored in a cache memory of a first core, the first core rewrites the data onto the cache memory, and a second core refers to the same data, when the second core performs a process on data on a shared memory (a memory shared between the cores) before rewriting, a problem occurs. In order to prevent the problem, the first core performs a process (writing-back process) of writing back the data rewritten to the cache memory onto the shared memory before the second core processes the data.

The cache memory manages, for example, the storage of data in the unit of a cache line which size is larger than the minimum memory access size. When different data items to be accessed by each of the plurality of cores are stored at adjacent addresses, these data items are likely to be managed by the same cache line. In this case, it is difficult for the plurality of cores to simultaneously access the cache line using the cache memories. As a result, the performance of the program deteriorates.

Figure 1:
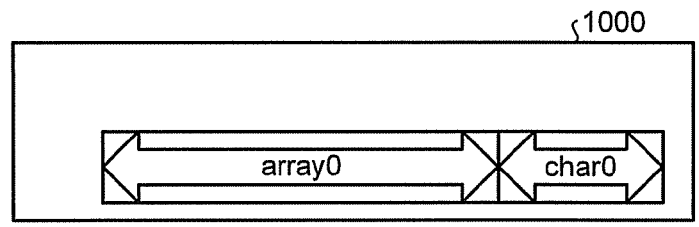
FIG. 1 is a diagram illustrating problems.

FIG. 1 is a diagram illustrating problems when different data items to be accessed by each of the plurality of cores are managed by the same cache line. In this embodiment, it is assumed that data with a size, which is a memory access unit, is referred to as access unit data. The access unit data includes one or a plurality of sets of, for example, a variable, an array, a structure, a pointer, and an array indicated by the pointer.

As illustrated in FIG. 1, "array0" and "char0", which are access unit data items, share a cache line 1000. It is assumed that "array0" and "char0" are data items which are accessed by different threads which can be executed at the same time. In this case, when the first core and the second core simultaneously access "array0" and "char0" in the shared memory through their own cache memories, respectively, "array0" is updated, but "char0" is not updated in the cache memory of the first core. In addition, "char0" is updated, but "array0" is not updated in the cache memory of the second core. Therefore, even though the writing-back process is performed on any cache memory after update, cache coherency is not maintained.

The program converting apparatus according to the embodiment of the invention analyzes a source program, specifies an access unit data item which is likely to cause performance deterioration when it shares the cache line with other access unit data items, and inserts, into the source program, a process (hereinafter, simply referred to as a non-sharing process) of arranging the memories such that the specified access unit data item does not share the cache line with other access unit data items.

Next, a program converting apparatus, a program converting method, and a recording medium according to the embodiments will be described in detail with reference to the accompanying drawings. The invention is not limited to the embodiments.

Figure 2:
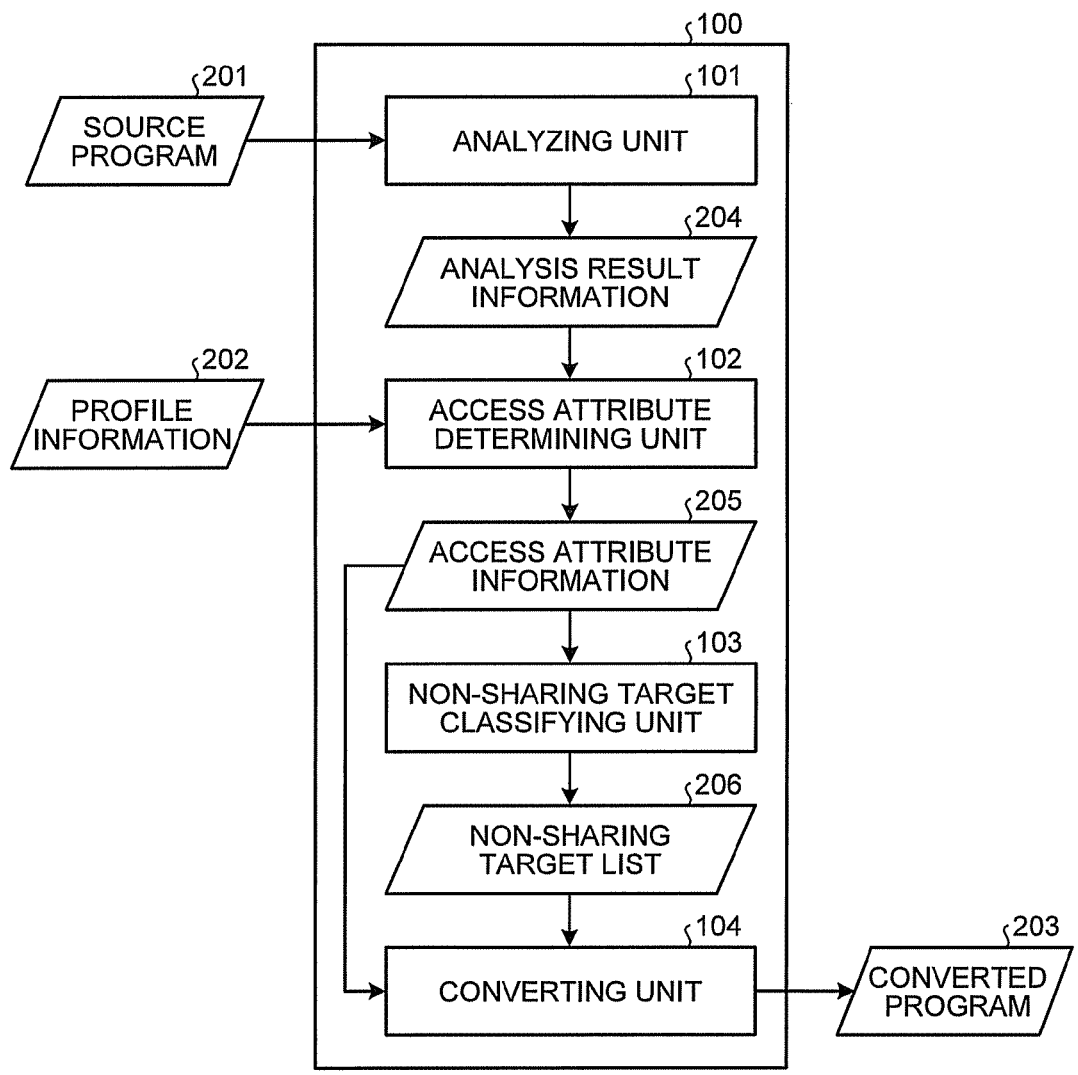
FIG. 2 is a diagram illustrating the functional structure of a program converting apparatus according to a first embodiment.

FIG. 2 is a diagram illustrating the functional structure of a program converting apparatus according to a first embodiment of the invention. A program converting apparatus 100 illustrated in FIG. 2 includes an analyzing unit 101, an access attribute determining unit 102, a non-sharing target classifying unit 103, and a converting unit 104. A source program 201 and profile information 202 are input to the program converting apparatus 100.

It is assumed that the source program 201 is described to be executed by an information processing apparatus in which cores individually include cache memories. Hereinafter, the cache memory is simply referred to as a cache.

Figure 3:
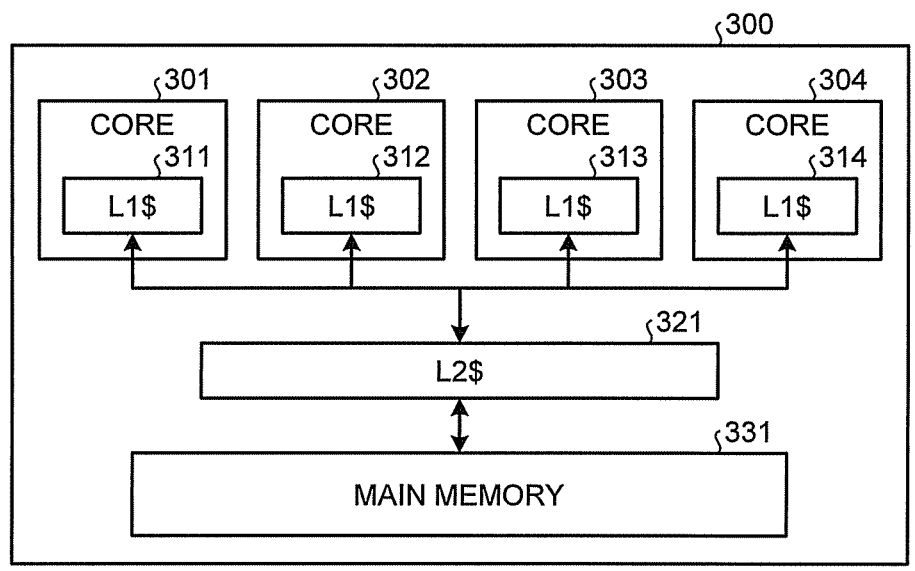
FIG. 3 is a diagram illustrating an example of the structure of an information processing apparatus, which is the execution target of a source program.

FIG. 3 is a diagram illustrating an example of the structure of the information processing apparatus which executes the source program 201. An information processing apparatus 300 includes a plurality of cores 301 to 304 respectively including L1 caches 311 to 314, a L2 cache 321, and a main memory 331. The L1 caches 311 to 314, the L2 cache 321, and the main memory 331 form a hierarchical memory structure. That is, the L1 caches 311 to 314 are connected to the common L2 cache 321 and the L2 cache 321 is connected to the main memory 331.

The capacities of the memories included in the information processing apparatus 300 are as follows: the main memory 331 has the largest capacity, followed by the L2 cache 321 and the L1 caches 311 to 314. The L1 caches 311 to 314 have the highest memory access speed, followed by the L2 cache 321 and the main memory 331. Therefore, during the access of the cores 301 to 304 to data items, when a data item is stored in the L2 cache 321 rather than the main memory 331 and when a data item is stored in the L1 caches 311 to 314 rather than the main memory 331 or the L2 cache 321, a data reading process or an access process can be performed at a high speed. The L1 caches 311 to 314 and the L2 cache 321 store the data items stored in the main memory, 331 in the unit of cache lines and have the same cache line size.

The profile information 202 is information in which the data item (that is, access unit data item) of a memory access target and the number of accesses to the access unit data item are described for each thread. The profile information 202 is generated by, for example, actually executing the source program 201. However, a method of generating the profile information 202 is not limited thereto. The profile information 202 may be input from the outside or it may be generated by the analyzing unit 101, which will be described below.

The analyzing unit 101 statically analyzes the input source program 201 to generate analysis result information 204. The analysis result information 204 includes a list (first list) of a pair of the thread and an access data item for each memory access which is executed by the threads forming the source program 201 and a list (second list) of a set of threads which are executed in parallel.

The access attribute determining unit 102 calculates exclusive memory accesses (exclusive accesses) from the memory accesses by the threads forming the source program 201 based on the analysis result information 204 and determines the memory accesses using the L1 caches 311 to 314 among the calculated exclusive accesses.

Next, an access attribute, which is attribute information defining the use or non-use of the cache memories (L1$311 to L1$314 and L2$321) when the memory access is performed, will be described. Only one access attribute may be exclusively given to one access unit memory at the same time, or a plurality of access attributes may be simultaneously given to one access unit memory. In this embodiment, it is assumed that a plurality of access attributes are not simultaneously given to one access unit data item. In addition, since the access attribute makes rules to follow in software, it does not depend on the physical position of hardware components, such as the position of the core in the architecture or the position of the cache memory.

For example, in this embodiment, it is assumed that a Private attribute defining the use of the L1 caches 311 to L1$314 and a Public attribute defining the non-use of the L1 caches 311 to 314 are used. From the viewpoint of maintaining cache coherency, when the access attribute is changed from the Private attribute to the Public attribute, it is necessary to perform the writing-back process and an invalidation process on target cache lines on the L1 caches 311 to 314.

The access attribute determining unit 102 determines the memory accesses using the L1 caches 311 to 314, that is, the memory accesses set to the Private attribute among the exclusive accesses. The other memory accesses have the Public attribute. Then, the access attribute determining unit 102 outputs the access attribute information 205 in which the determined access attribute is described for each memory access.

The access attribute determining unit 102 determines the Private attribute or the Public attribute to be set to the exclusive access from the viewpoint of improving the execution performance of the source program 201. Specifically, the access attribute determining unit 102 calculates performance evaluation values (hereinafter, simply referred to as evaluation values) both when the Public attribute is set and when the Private attribute is set, based on the profile information 202 and selects the optimal access attribute from the calculated evaluation values. Examples of the evaluation value include the number of accesses to the access unit data item, an access time, power required for access, the amount of heat generated from access, the time required to change the access attribute of the access unit data item, the time required for one access to the access unit data item, and combinations thereof. In this embodiment, it is assumed that the access attribute determining unit 102 calculates the evaluation value based on the input profile information 202.

The non-sharing target classifying unit 103 determines an access unit data item which does not share the cache line with an arbitrary access data item, that is, an access unit data item to be subjected to a non-sharing process, among all of the access unit data items with reference to the access attribute information 205, based on whether at least the writing-back process is required. In the first embodiment, the non-sharing target classifying unit 103 determines the access unit data item set to the Private attribute to be a non-sharing process target, and outputs a non-sharing target list 206 including the specified access unit data item, which is the non-sharing process target, as the classification result.

The converting unit 104 inserts the non-sharing process into the source program 201 based on the non-sharing target list 206 and also inserts an access attribute setting process into the source program 201 based on the access attribute information 205, thereby generating a converted program 203.

Figure 4:
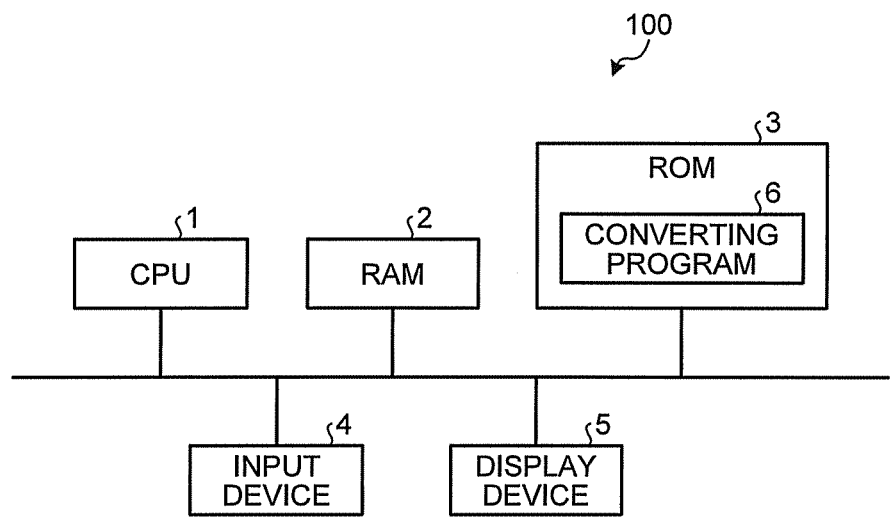
FIG. 4 is a diagram illustrating an example of the hardware configuration of the program converting apparatus according to the first embodiment.

FIG. 4 is a diagram illustrating an example of the hardware configuration of the program converting apparatus 100. The program converting apparatus 100 includes a central processing unit (CPU) 1, a random access memory (RAM) 2, a read only memory (ROM) 3, an input device 4, and a display device 5. The CPU 1, the RAM 2, the ROM 3, the input device 4, and the display device 5 are connected to each other through a bus line.

The display device 5 is a device capable of displaying information, such as a liquid crystal monitor. The display device 5 displays output information to the user. The input device 4 includes, for example, a mouse or a keyboard and receives the operation information of the program converting apparatus 100 from the user. The input operation information is transmitted to the CPU 1.

The ROM 3 is a recording medium that stores a converting program 6 for performing a program converting method according to the first embodiment. The CPU 1 reads the converting program 6 from the ROM 3 through the bus line, loads the converting program 6 to the RAM 2, and executes the converting program 6 loaded to the RAM 2. When the converting program 6 is loaded to the RAM 2, the analyzing unit 101, the access attribute determining unit 102, the non-sharing target classifying unit 103, and the converting unit 104 are generated on the RAM 2. The converting program 6 may be provided or distributed through a network, such as the Internet. In addition, the recording medium, which is the load source of the converting program 6, may be an external storage device, a removable memory device, or an optical disk device.

The source program 201 or the profile information 202 is input from, for example, an external storage device (not illustrated). The CPU 1 performs various kinds of processes using the input source program 201 and profile information 202 under the control of the converting program 6 loaded to the RAM 2 and temporarily stores data items generated by the various kinds of processes, that is, the analysis result information 204, the access attribute information 205, the non-sharing target list 206, and other work data items in a data storage area which is formed in the RAM 2. The CPU 1 outputs the converted program 203 which is generated using the data item temporarily stored in the data storage area to, for example, a program storage area of the RAM 2 or the external storage device.

Figure 5:
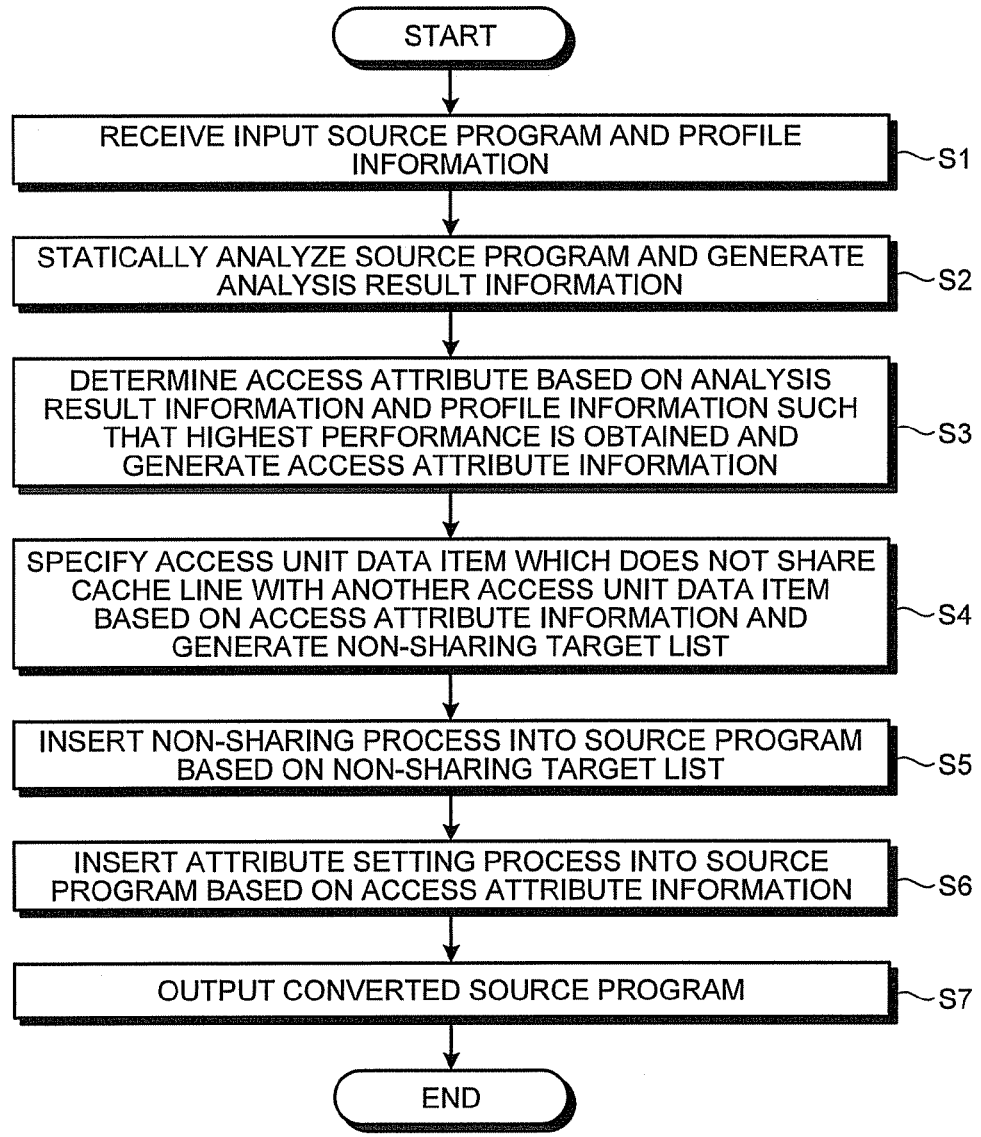
FIG. 5 is a flowchart illustrating the operation of the program converting apparatus according to the first embodiment.

Next, a detailed example of the operation of the program converting apparatus 100 will be described. FIG. 5 is a flowchart illustrating the operation of the program converting apparatus 100.

First, in Step S1, the program converting apparatus 100 receives the input source program 201 and profile information 202.

Figures 6, 7:
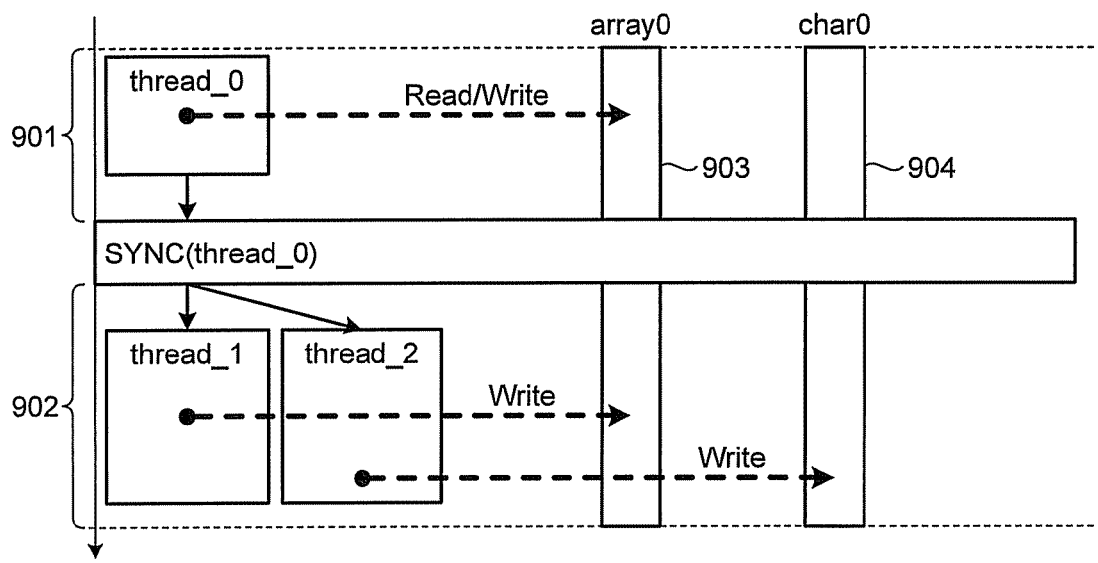
FIG. 6 is a diagram illustrating an example of a source program.
FIG. 7 is a diagram illustrating memory accesses in chronological order.

FIG. 6 is a diagram illustrating an example of the input source program 201 and FIG. 7 is a diagram illustrating the memory accesses in chronological order when the source program 201 is executed. Next, each process will be described using the source program 201 illustrated in FIG. 6 as an example.

In the source program 201, "array0[10]" indicates the array of 10 elements and "char0" indicates one variable. Each of "thread_0", "thread_1", and "thread_2" indicates a thread. "SYNC (thread_0)" indicates a synchronization process which does not perform the subsequently described process until thread_0 ends. "READ (array0[i])" indicates a reading process on an i-th element of array0, "WRITE (array0[i])" indicates a writing process on the i-th element of "array0", and "WRITE (char0)" indicates a writing process on a variable char0. As illustrated in FIG. 7, the processes of "thread_1" and "thread_2" may be performed in parallel.

Figures 8, 9:
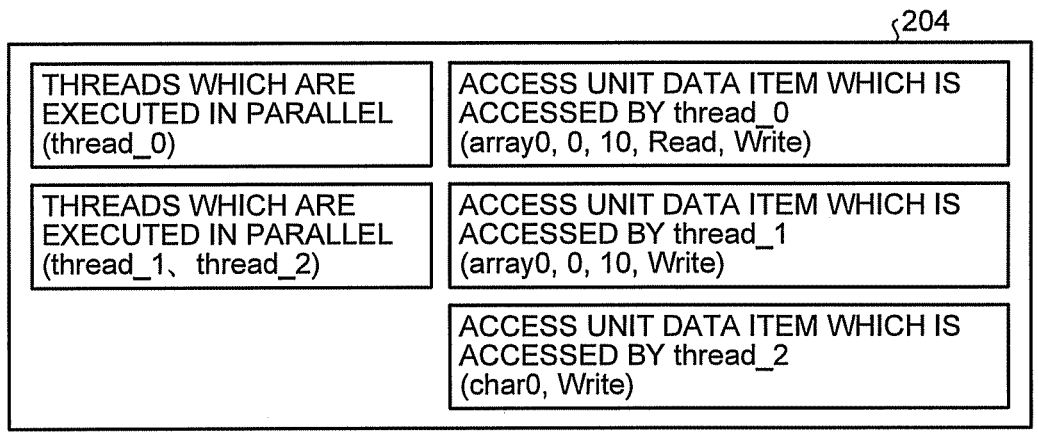
FIG. 8 is a diagram illustrating an example of profile information according to the first embodiment.
FIG. 9 is a diagram illustrating an example of analysis result information according to the first embodiment.

FIG. 8 is a diagram illustrating an example of the profile information 202. In the profile information 202, the number of accesses is described for each thread. For example, a description "thread0 array0 10 Read 10 Write" indicates that "thread0" performs 10 reading processes and 10 writing processes on the access unit data item "array0".

In Step S2, when the source program 201 and the profile information 202 are input, the analyzing unit 101 statically analyzes the source program 201 and specifies all of the memory accesses and the threads which are executed in parallel, thereby generating the analysis result information 204 S2.

FIG. 9 is a diagram illustrating an example of the analysis result information 204. In Step S2, first, the analyzing unit 101 analyzes that "thread_0", "thread_1", and "thread_2" respectively access the access unit data items "array0", "array0", and "char0" from "READ (array0[i])", "WRITE (array0[i])", or "WRITE (char0)" described in the threads of the source program 201. In addition, the analyzing unit 101 analyzes that "thread_0" is not executed in parallel to other threads and "thread_1" and "thread_2" are executed in parallel. Here, content describing the memory access may include an access type (for example, Read and Write) or it may not include the access type.

In the case of a set of a plurality of data items including loop index information, such as "array0[i]", the access unit data item is described for each element in the analysis result information 204. However, simply, "array0" may be described as the access unit data item.

Then, in Step S3, the access attribute determining unit 102 determines the access attribute of each memory access based on the analysis result information 204 and the profile information 202 and generates the access attribute information 205. When the memory access is an exclusive access, it may be set to the Private attribute. The analysis result information 204 shows that there is no thread which is executed in parallel to "thread_0" and the memory access of "thread_0" to "array0" is an exclusive access since "thread_0" accesses "array0". In addition, the analysis result information 204 shows that "thread_1" and "thread_2" can be executed in parallel and each of the memory access of "thread_1" to "array0" and the memory access of "thread_2" to "char0" is an exclusive access since "thread_1" accesses "array0" and "thread_2" accesses "char0". The access attribute determining unit 102 specifies the memory access having the Private attribute, calculates evaluation values both when the specified memory access is set to the Private attribute and when the specified memory access is set to the Public attribute, compares the evaluation values, determines the access attribute capable of obtaining the highest performance to be the access attribute of the specified memory access.

The access unit data items "array0" and "char0" of the source program 201 will be described as an example. First, it is assumed that, in an initial state, all of the access unit data items have the Public attribute for all the threads. When the access attribute is changed, it is assumed that, the access attribute is changed when a period separated by a synchronization process (hereinafter, simply referred to as a period) or a thread starts, and the Public attribute is changed for all the threads when the period or the thread ends. In addition, it is assumed that the evaluation values are the product of the time required for one access to the access unit data item for each period and the number of accesses, and the sum of the time required to change the access attribute and it is preferable that the evaluation value for all the threads, which is the sum of the evaluation values for each thread, be small. It is assumed that the time required for one access to the access unit data item on the L1 cache is 1 cycle, the time required for one access to the access unit data item on the L2 cache is 20 cycles, and the time required to change the access attribute is 10 cycles.

As illustrated in FIG. 7, "array0" is accessed twenty times for a period 901 and is accessed ten times for a period 902. In addition, the attribute of "array0" is changed to the Private attribute when the execution of "thread_0" and "thread_1" starts and is changed to the Public attribute when the execution of "thread_0" and "thread_1" ends. Therefore, the attribute of "array0" is changed four times. In this case, the evaluation value of "array0" is "70 (=1 cycle×20 times+1 cycle×10 times+10×4 times)". Similarly, the evaluation values for combinations of the access attributes are calculated from the attribute of "array0" for each period. The evaluation value is "240" when the access attribute for "thread_0" is the Private attribute for the period 901 and the access attribute for all the threads is the Public attribute for the period 902. The evaluation value is "430" when the access attribute for all the threads is the Public attribute for the period 901 and the access attribute for "thread_1" is the Private attribute for the period 902. The evaluation value is "600" when the access attribute for all the threads is the Public attribute for the period 901 and the access attribute for all the threads is the Public attribute for the period 902. As can be seen from the above, the optimal access attribute is the Private attribute for "thread_0" for the period 901 and is the Private attribute for "thread_1" for the period 902.

In addition, "char0" is not accessed for the period 901 and is accessed once for the period 902. When the access attribute of "char0" for "thread_0" for the period 901 is the Private attribute and the access attribute of "char0" for "thread_2" for the period 902 is the Private attribute, the evaluation value is "41 (=1 cycle×0 times+1 cycle×one time+10×4 times (change of the access attribute))". Similarly, the evaluation values for combinations of the access attributes of "array0" for each period are calculated. The evaluation value is "40" when the access attribute for "thread_0" is the Private attribute for the period 901 and the access attribute for all the threads is the Public attribute for the period 902. The evaluation value is "21" when the access attribute for all the threads is the Public attribute for the period 901 and the access attribute for "thread_2" is the Private attribute for the period 902. The evaluation value is "20" when the access attribute for all the threads is the Public attribute for the period 901 and the access attribute for all the threads is the Public attribute for the period 902. As can be seen from the above, the optimal access attribute is the Private attribute for all the threads for the period 901 and is the Public attribute for all the threads for the period 902.

Figure 10:
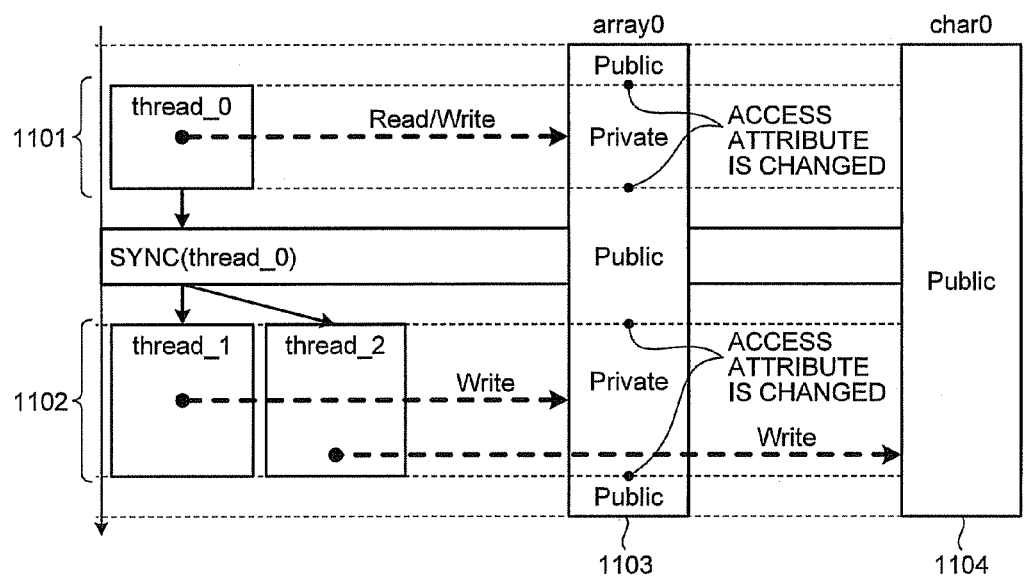
FIG. 10 is a diagram illustrating the determination result of an access attribute.

As such, as illustrated in FIG. 10, the access attribute is determined from the evaluation value. A period 1101 and a period 1102 are separated by, for example, synchronization, similarly to the period 901 and the period 902, and reference numerals 1103 and 1104 indicate the access attributes of "array0" and "char0", respectively. The access attribute of "array0" is determined to be the Private attribute for "thread_0" for the period 1101 and is determined to be the Private attribute for "thread_1" for the period 1102. The access attribute of "char0" is determined to be the Public attribute for all of the periods.

Figure 11:
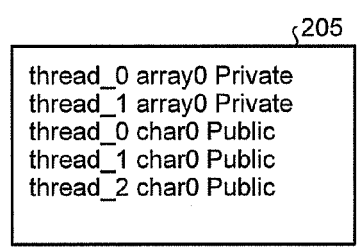
FIG. 11 is a diagram illustrating an example of access attribute information according to the first embodiment.

FIG. 11 is a diagram illustrating an example of the access attribute information 205 in which the determined access attribute is described. The access attribute information 205 shows that the Private attribute is set to each of the memory access of "thread_0" to "array0" and the memory access of "thread_1" to "array0" and the Public attribute is set to each of the memory access of "thread_0" to "char0", the memory access of "thread_1" to "char0", and the memory access of "thread_2" to "char0".

In this embodiment, the access attribute determining unit 102 acquires the number of memory accesses from the profile information 202. However, the access attribute determining unit 102 may acquire the number of memory accesses calculated by the analyzing unit 101. Specifically, for example, the access attribute determining unit 102 can know that the number of read memory accesses of "thread_0" to "array0" is 10 and the number of write memory accesses of "thread_0" to "array0" is 10, that is, the total number of memory accesses is 20 from the description of the program. When the profile information 202 is not used to calculate the evaluation value, it is not necessary to input the profile information 202 to the program converting apparatus 100.

Information used to calculate the evaluation value, such as the time required for one memory access to the access unit data item or the time required to change the access attribute, may be stored in the access attribute determining unit 102 in advance, or it may be input from the outside to the program converting apparatus 100.

Then, in Step S4, the non-sharing target classifying unit 103 extracts the access unit data item, which is a non-sharing process target, based on the access attribute information 205 and outputs the non-sharing target list 206. Specifically, when Step S4 starts, the non-sharing target classifying unit 103 extracts the access unit data item which is accessed with the Private attribute and records the access unit data item in the non-sharing target list 206. According to the access attribute information 205, "array0" is accessed with the Private attribute and "char0" is accessed with the Public attribute. Therefore, in Step S11, "array0" is recorded as a non-sharing process target in the non-sharing target list 206.

Then, in Step S5, the converting unit 104 inserts the non-sharing process into the source program 201 based on the non-sharing target list 206. The non-sharing process may be described by various kinds of schemes, such as an API scheme, a compiler pragma scheme, a scheme which make an object have non-shared information, and a pointer scheme.

FIGS. 12A to 12D are diagrams illustrating examples of the description of the source program 207 into which the non-sharing process is inserted. FIG. 12A illustrates the source program described by the API scheme, FIG. 12B illustrates the source program described by the scheme which makes an object have non-shared information, FIG. 12C illustrates the source program described by the compiler pragma scheme, and FIG. 12D illustrates the source program described by the pointer scheme. In FIGS. 12A to 12D, "UNSHARED(array0)" (FIG. 12A, 2071), "#pragma unshared array0" (FIG. 12B, 2072), "array0.unshared( )" (FIG. 12C, 2073), and "unshared*unsharedlist[1]" and "unshared_list[0]=array0" (FIG. 12D, 2074) correspond to the non-shared information. In the source program 201, since there are "array0" and "char0" as the access unit data items, "array0" is a non-sharing process target, similarly to "char0" which is a non-sharing process target. In the examples illustrated in FIGS. 12A to 12D, the non-sharing process may be performed on each of "array0" and "char0". Specifically, 2071 may be changed to "UNSHARED(array0, char0)". Similarly, 2072 may be changed to "#pragma unshared array( ) char0", 2073 may be changed to "array0.unshared( )" and "char0.unshared( )", and 2074 may be changed to "unshared*unsharedlist[2]", "unsharedlist[0].array0", and "unsharedlist[1].char0".

Then, in Step S6, the converting unit 104 inserts the attribute setting process into the source program 207 based on the access attribute information 205. The attribute setting process may be described by various kinds of schemes, such as an API scheme, a compiler pragma scheme, a scheme which makes an object have information for designating the access attribute, and a pointer scheme.

FIGS. 13A to 13D are diagrams illustrating examples of the description of the converted program 203 in which the attribute setting process is inserted. FIG. 13A illustrates the converted program described by the API scheme, FIG. 13B illustrates the converted program described by the scheme which makes an object have information for designating the access attribute, FIG. 13C illustrates the converted program described by the compiler pragma scheme, and FIG. 13D illustrates the converted program described by the pointer scheme. In FIG. 13A, "PRIVATE(array0)" and "PUBLIC(array0)" (2031) correspond to the attribute setting process. "PRIVATE(array0)" is a process API for setting "array0" to the Private attribute and "PUBLIC(array0)" is a process API for setting "array0" to the Public attribute. 2032 in FIGS. 13B and 2033 in FIG. 13C correspond to the attribute setting process. Similarly, "array0" is changed to the Private attribute or the Public attribute. In FIG. 13D, "public int array[0]", "private int*private_array0", "private_array0=array", and "array0=private_array0" (2034) correspond to the attribute setting process. 2034 is a description in which the address of the access unit data item "array0" is given to a pointer variable "*private_array0" having the Private attribute, thereby setting "array0" to the Private attribute. In FIG. 13D, when "thread_0" and "thread_1" are not included, the setting of the Private attribute is invalidated and the access attribute returns to the Public attribute.

Then, in Step S7, the converting unit 104 outputs the converted program 203 having the non-sharing process and the attribute setting process inserted thereinto and ends its operation.

In this embodiment, the converting unit 104 inserts the non-sharing process into the source program 201 and then inserts the attribute setting process into the source program 201. However, the insertion order of the processes is not limited thereto.

The converting unit 104 may further include a compiler device, generate a program code which is executable on hardware or a virtual machine, and output the generated program code as the converted program 203. In addition, the converting unit 104 may generate memory map information which can be input to the compiler device, and output the generated memory map information.

In this embodiment, the Private attribute and the Public attribute are used as the access attributes. However, other various access attributes may be additionally defined, or the Private attribute or the Public attribute may be subdivided to define access attributes. For example, when two or more of the cores 301 to 304 perform only a reading process on the same access unit data items, attributes which allow the movement of data to the L1 caches of the cores may be used. When various kinds of access attributes can be set, the non-sharing target classifying unit 103 may determine whether to perform the non-sharing process on the access unit data item based on whether the writing back process (and the invalidation process) is required in order to maintain cache coherency. That is, the non-sharing target classifying unit 103 may classify the access unit data items set to the access attribute requiring the writing-back process as a non-sharing process target, and may not classify the access unit data items to which the access attribute requiring the writing-back process is not set for any memory access as the non-sharing process target. A process requiring the writing-back process corresponds to a memory access which performs a writing process using the L1 caches 311 to 314. The analyzing unit 101 may describe an access type in the first list in which the thread and the access unit data item for each memory access are described and input the first list to the non-sharing target classifying unit 103 such that the non-sharing target classifying unit 103 can specify the memory access which performs the writing process using the L1 caches 311 to 314.

The language for describing the source program 201 is not limited to a specific language. For example, a C language or a Java language may be used, or a programming language peculiar to a specific processing apparatus may be used.

The source program 201 may be described in one file or it may be separately described in a plurality of files. Similarly, the converted program 203 may be divided into a plurality of parts and then output.

The target architecture of the source program 201 which can be converted by the program converting apparatus 100 is not limited to the information processing apparatus 300. For example, the target architecture of the source program 201 which can be converted by the program converting apparatus 100 may be an architecture which has only the L1 cache and does not have the L2 cache. In addition, the target architecture of the source program 201 may be an architecture including one L3 cache which can be read and written by all the cores, operates at a speed that is lower than that of the L2 cache and is higher than that of the main memory, and has a capacity that is more than that of the L2 cache and is less than that of the main memory. An architecture in which the number of memory layers increases may be used. In addition, an architecture in which the L2 cache can be accessed only by a specific core may be used. An architecture having a scratch pad memory and an architecture in which the L1 cache can be accessed by other cores may be used.

In this embodiment, the access attribute determining unit 102 specifies the exclusive access based on the analysis result information 204. However, the following analysis process may be performed: a compiler-dependent analysis technique is used to extract the access unit data item which is accessed only by a specific thread or the access unit data item which is accessed only by one of a plurality of threads executed in parallel.

In addition, a list of a set of the threads which are executed in parallel may be included in the profile information 202 and the access attribute determining unit 102 may specify the exclusive access from the profile information 202. The profile information 202 is not necessarily limited to information indicating the entire source program 201. For example, there is a condition branch in a given thread of the source program 201. If the thread accesses a given access unit data item only when the condition is satisfied, the profile information 201 generated when the condition is not satisfied does not hold information when the condition is satisfied. In this case, when analysis based on the profile information 201 is performed, an error is likely to occur in the analysis result. In order to prevent the problem, a method may be used in which the programmer designates whether to perform the exclusive access of the thread to the access unit data item in the source program 201.

As such, according to the first embodiment, the access attribute determining unit 102 calculates the exclusive accesses from the memory accesses by the threads forming the source program 201 and determines the memory accesses using the L1 caches 311 to 314 among the calculated exclusive accesses. The non-sharing target classifying unit 103 determines the access unit data item which is determined to be accessed using the L1 caches 311 to 314 not to share the cache line with other access unit data items. The converting unit 104 inserts a process (attribute setting process) using the L1 caches 311 to 314 into the source program 201 based on the determination result of the access attribute determining unit 102, inserts the non-sharing process into the source program 201 based on the determination result of the non-sharing target classifying unit 103, and outputs the converted program 203. Therefore, the memory access requiring the writing-back process is included in the memory accesses using the L1 caches 311 to 314, and the access unit data items accessed by the L1 caches 311 to 314 is not shared. That is, in the converted program 203 generated by the program converting apparatus 100, the access unit data items which are accessed by the plurality of cores 301 to 304 using the L1 caches 311 to 314 are arranged in different cache lines. Therefore, even when the plurality of cores 301 to 304 perform the memory accesses using the L1 caches 311 to 314 at the same time, cache coherency can be maintained. According to the first embodiment, it is possible to perform conversion to a program capable of effectively using the cache memories in a multi-processor environment in which the processor cores have the cache memories.

In addition, the analyzing unit 101 is further provided which generates the first list in which a pair of the thread and the access unit data item for each memory access by the source program 201 is described and the second list in which a set of the threads which are executed in parallel is described, and the access attribute determining unit 102 calculates the exclusive accesses based on the first and second lists.

The access attribute determining unit 102 evaluates the performance of the exclusive accesses both when the L1 caches 311 to 314 are used and when the L1 caches 311 to 314 are not used and determines the memory accesses using the L1 caches 311 to 314 among the exclusive accesses based on the evaluation result of the performance. Therefore, according to the first embodiment, the L1 caches 311 to 314 may not be used even when the performance of the exclusive access deteriorates. Therefore, it is possible to perform conversion to a program capable of effectively using the cache memory.

When a given access unit data item shares the cache line with a specific access unit data item, the performance deteriorates due to restrictions in maintaining cache coherency. However, in some cases, even when the given access unit data item shares the cache line with access unit data items other than the specific access unit data item, the performance does not deteriorate. A program converting apparatus according to a second embodiment does not collectively determine the access unit data items requiring the writing-back process to be a non-sharing process target. That is, the program converting apparatus specifies a pair of access unit data items whose performance deteriorates when they share the cache line and determines only the specified pair of access unit data items to be the non-sharing process target. In addition, for an access unit data item which is accessed in parallel to the access unit data item requiring the writing-back process, when a memory access to the access unit data item which is accessed in parallel to the access unit data item requiring the writing-back process is a reading process and the access unit data item does not require the writing-back process, both the access unit data items are permitted to share the cache line.

Next, in the second embodiment, the difference between the second embodiment and the first embodiment will be mainly described with reference to the functional structure diagram of FIG. 2 and the flowchart of FIG. 5 described in the first embodiment.

Figures 14, 15:
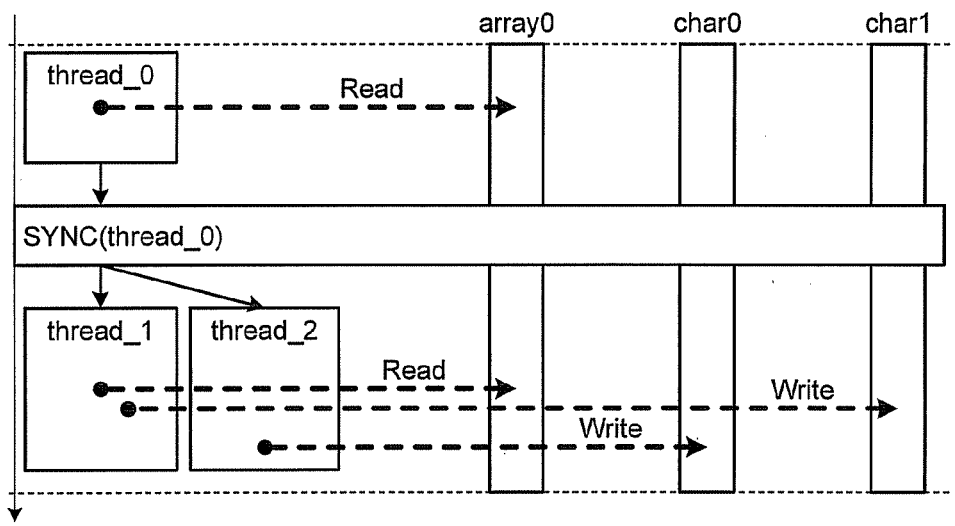
FIG. 14 is a diagram illustrating an example of a source program according to a second embodiment.
FIG. 15 is a diagram illustrating memory accesses in chronological order.

FIG. 14 is a diagram illustrating another example of the source program 201 input to the program converting apparatus 100 and FIG. 15 is a diagram illustrating memory accesses in chronological order when the source program 201 illustrated in FIG. 14 is executed.

In the source program 201 illustrated in FIG. 14, "char1" indicates one variable different from that indicated by "char0". As illustrated in FIG. 15, according to the source program 201, "thread_0" performs a reading process on 10 elements of "array0". After the process of "thread_0" ends, "thread_1" performs a reading process on each element of "array0" and performs a writing process on "char1", and "thread_2" performs a writing process on "char0". The processes of "thread_1" and "thread_2" may be performed in parallel.

FIG. 16 is a diagram illustrating profile information 202. The numbers of accesses of "thread_0", "thread_1", and "thread_2" to "array0", "char0", and "char1" are recorded in the profile information 202.

FIG. 17 is a diagram illustrating analysis result information 204. The analysis result information 204 illustrates that there is no thread which is executed in parallel to "thread_0" and "thread_0" performs a reading process on "array0". In addition, "thread_1" and "thread_2" can be executed in parallel, the "thread_1" performs a reading process on "array0" and performs a writing process on "char1", and "thread_2" performs a writing process on "char0".

Figure 18:
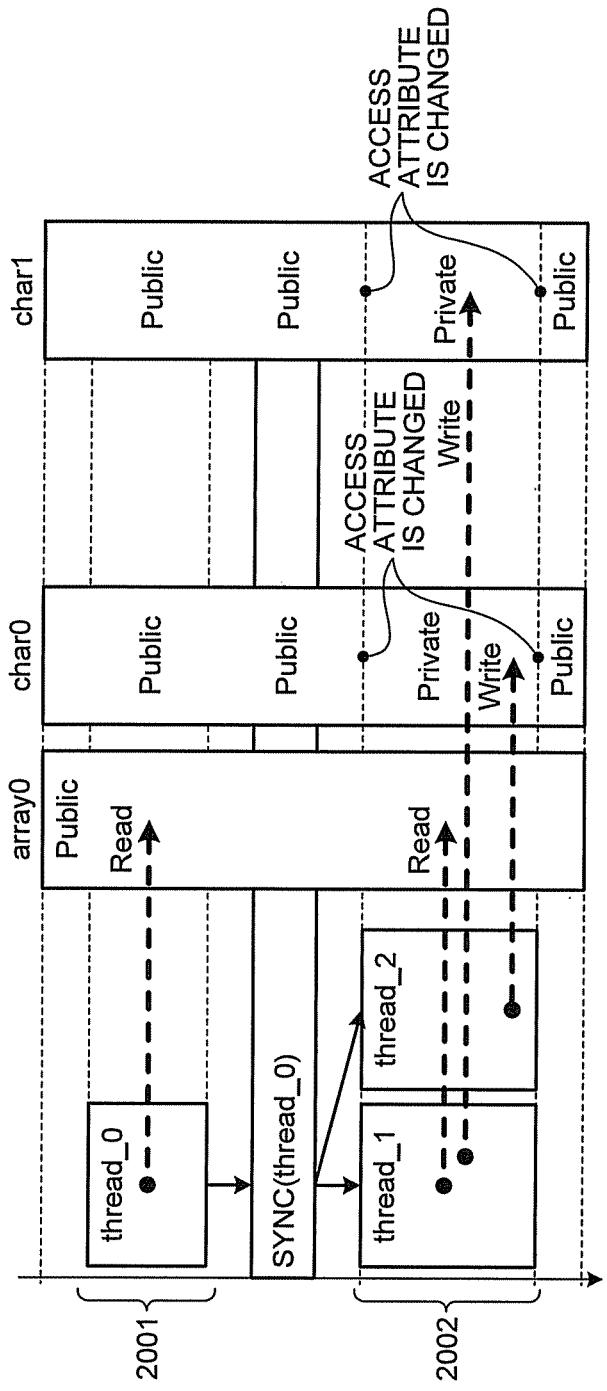
FIG. 18 is a diagram illustrating the determination result of an access attribute.

FIG. 18 is a diagram illustrating the determination result of the access attribute. As illustrated in FIG. 18, for a period 2001 for which "thread_0" is executed, "array0", "char0", and "char1" have the Public attribute for all the threads. For a period 2002 for which "thread_1" and "thread_2" are executed in parallel, "array0" has the Public attribute, "char0" has the Private attribute for "thread_1", "char1" has the Private attribute for "thread_2".

FIG. 19 is a diagram illustrating access attribute information 205 according to the second embodiment which is output from the access attribute determining unit 102 in Step S3. In the access attribute information 205 according to the second embodiment, the access attribute is described for each memory access and an access type is described in the memory access with the Public attribute. In addition, a list of a set of the threads which are executed in parallel is described in the access attribute information 205.

Figure 20:
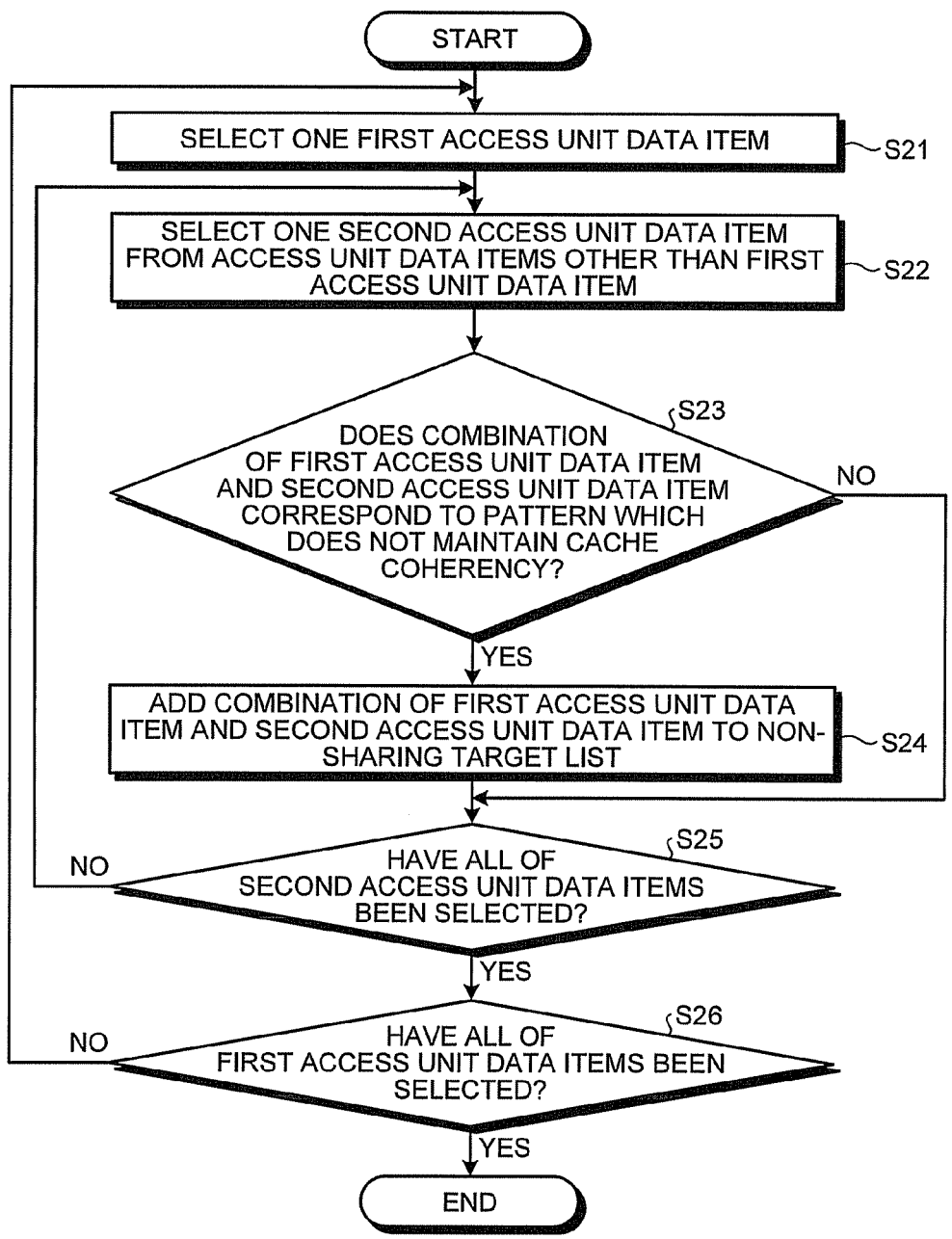
FIG. 20 is a flowchart illustrating in detail Step S4 in the second embodiment.

FIG. 20 is a flowchart illustrating in detail Step S4 in the second embodiment. In Step S21, when Step S4 starts, the non-sharing target classifying unit 103 selects one access unit data item described in the access attribute information 205. The access unit data item selected in Step S21 is referred to as a first access unit data item.

Then, in Step S22, the non-sharing target classifying unit 103 selects one access unit data item different from the first access unit data item. The access unit data item selected in Step S22 is referred to as a second access unit data item.

Then, in Step S23, the non-sharing target classifying unit 103 determines whether a combination of the first and second access unit data items corresponds to a pattern which does not maintain cache coherency. When the combination corresponds to the pattern which does not maintain cache coherency (Yes in S23), the non-sharing target classifying unit 103 adds the combination to the non-sharing target list 206 in Step S24. When the combination does not correspond to the pattern which does not maintain cache coherency (No in S23), the non-sharing target classifying unit 103 skips the process of Step S24.

FIG. 21 is a diagram illustrating the combination which is added to the non-sharing target list 206 and the combination which is not added to the non-sharing target list 206. FIG. 21 illustrates an example of the relation between the first and second access unit data items and two threads "thread_x" and "thread_y" which are executed in parallel.

In pattern 0, "thread_x" and "thread_y" perform a memory access with the Private attribute on the first access unit data item and neither "thread_x" nor "thread_y" accesses the second access unit data item. In pattern 0, the first and second access unit data items are not accessed at the same time. Therefore, even when the first and second access unit data items share the cache line for "thread_x" and "thread_y", cache coherency can be maintained. That is, the combination of the first and second access unit data items is not determined to be a non-sharing process target for "thread_x" and "thread_y".

In pattern 1, "thread_x" performs a memory access with the Private attribute on the first access unit data item, "thread_y" does not access the first access unit data item, "thread_x" does not access the second access unit data item, and "thread_y" performs a reading process with the Public attribute on the second access unit data item. In pattern 1, when the first and second access unit data items are arranged in the same cache line, "thread_x" performs the writing-back process on the cache line. Before and after the "thread_x" performs the writing-back process, the second access unit data item is not changed. In addition, even when "thread_y" performs a memory access, the second access unit data item is not changed. Therefore, even when the first access unit data item and the second access unit data item share the cache line, cache coherency can be maintained. That is, the combination of the first and second access unit data items is not determined to be a non-sharing process target for "thread_x" and "thread_y".

In pattern 2, "thread_x" performs a memory access with the Private attribute on the first access unit data item, "thread_y" does not access the first access unit data item, "thread_x" does not access the second access unit data item, and "thread_y" performs a writing process with the Public attribute on the second access unit data item. In pattern 2, when the first and second access unit data items are arranged in the same cache line, "thread_x" performs the writing-back process on the cache line and the second access unit data item is not changed before and after "thread_x" performs the writing-back process. On the other hand, the second access unit data item is changed by a memory access by "thread_y". Therefore, when the first and second access unit data items share the cache line, it is difficult to maintain cache coherency. That is, the combination of the first and second access unit data items is determined to be a non-sharing process target for "thread_x" and "thread_y".

In pattern 3, "thread_x" performs a memory access with the Private attribute on the first access unit data item, "thread_y" does not access the first access unit data item, "thread_x" does not access the second access unit data item, and "thread_y" performs a memory access with the Private attribute on the second access unit data item. Pattern 3 corresponds to the case described with reference to FIG. 1. That is, when the first and second access unit data items share the cache line, it is difficult to maintain cache coherency. That is, the combination of the first and second access unit data items is determined to be a non-sharing process target for "thread_x" and "thread_y".

In pattern 4, "thread_x" and "thread_y" perform a memory access with the Public attribute on the first and second access unit data items. In pattern 4, the first and second access unit data items do not require the writing-back process in neither the memory access by "thread_x" nor the memory access by "thread_y". Therefore, even when the two access unit data items share the cache line, cache coherency can be maintained. That is, the combination of the first and second access unit data items is not determined to be a non-sharing process target for "thread_x" and "thread_y".

The determination process of Step S23 is performed on all of the pairs of the threads which can be executed in parallel. When the combination of the first and second access unit data items corresponds to pattern 2 or pattern 3 for any one of the pairs of the threads, the determination result in Step S23 is "Yes". When the combination of the first and second access unit data items corresponds to pattern 0, pattern 1, or pattern 4 for all of the pairs of the threads, the determination result in Step S23 is "No".

A non-sharing target list is added to the combination of the first and second access unit data items corresponding to pattern 2 and pattern 3. For example, in the case of pattern 3, a combination of "char0" and "char1" accessed by "thread_1" and "thread_2" is described.

The access attribute determining unit 102 may not describe the access type or the list of a set of the threads which are executed in parallel in the access attribute information 205 and the non-sharing target classifying unit 103 may perform the determination process of Step S23 with reference to the access type and the list of a set of the threads which are executed in parallel, which are described in the analysis result information 204, and the access attribute information 205.

After it is determined in Step S23 that the combination does not correspond to the pattern (No in Step S23) or after Step S24, the non-sharing target classifying unit 103 determines in Step S25 whether all of the second access unit data items have been selected. When there is a remaining access unit data item which can be selected as the second access unit data item (No in Step 25), the non-sharing target classifying unit 103 returns to Step S22 and selects a new second access unit data item from the non-selected access unit data items. When there is no non-selected access unit data item (Yes in Step S25), the non-sharing target classifying unit 103 further determines in Step S26 whether all of the first access unit data items have been selected. When there is a remaining access unit data item which can be selected as the first access unit data item (No in Step S26), the non-sharing target classifying unit 103 returns to Step S21 and selects a new first access unit data item from the non-selected access unit data items. When there is no non-selected access unit data item (Yes in S26), the non-sharing target classifying unit 103 ends Step S4. When it is determined in Step S25 that all of the second access unit data items have been selected (Yes in Step S25), the selection history of the second access unit data item is reset.

In Step S5, the converting unit 104 inserts the non-sharing process which does not arrange the combinations of access unit data items described in the non-sharing target list 206 in the same cache line.

As described above, according to the second embodiment, the non-sharing target classifying unit 103 does not collectively determine the access unit data items which are accessed with the Private attribute to be a non-sharing process target, but determines the first access unit data item which is accessed with the Private attribute is performed by one thread and the second access unit data item which is written with the Public attribute by another thread or which is accessed with the Private attribute by another thread among the threads which are executed in parallel to be a cache line non-sharing target. In this way, the amount of access unit data items, which are the non-sharing target, can be reduced as compared to the first embodiment. As a result, the program can be converted such that the cache memory can be effectively used.

The non-sharing target classifying unit 103 may determine the first access data item which is written with the Private attribute by one thread and the second access data item which is written with the Private attribute or the Public attribute by another thread among the threads which are executed in parallel to be the cache line non-sharing target. In this case, the amount of access unit data items, which is a non-sharing target, can be reduced. As a result, the program can be reduced such that the cache memory can be effectively used.

In a case in which a plurality of access unit data items are constantly accessed with the same access attribute by the same thread at the same timing, even when the access attribute requires the writing-back process and the plurality of access unit data items share the cache line, cache coherency can be maintained. In this case, even when the plurality of access unit data items are set to the Private attribute, combinations of the plurality of access unit data items may be arranged in the same cache line.

Specifically, the non-sharing target classifying unit 103 extracts a plurality of access unit data items having the same combination of the thread which performs a memory access and the access attribute of the memory access for each thread, and excludes any pair of the plurality of extracted access unit data items from the cache line non-sharing process target.

For example, the memory access illustrated in FIG. 22 is considered. In this case, for a period 2501, "thread_0" performs a memory access with the Private attribute on "array0" and "array1". For a period 2502, "thread_1" performs a memory access with the Private attribute on "array0" and "array1". The non-sharing target classifying unit 103 excludes a pair of "array0" and "array1" from the non-sharing process target since a combination of the thread which performs the memory access and the access attribute of the memory access is the same for each thread.

As such, according to the third embodiment, a plurality of access unit data items having the same combination of the thread that performs a memory access and the access attribute of the memory access for each thread are excluded from the non-sharing process target. Therefore, the cache memory can be effectively used, as compared to the case in which a plurality of access unit data items are a non-sharing process target.

Various kinds of processes may be performed using a portion of data forming an array or a structure, such as one or more elements of an array or a member variable of a structure, as the access unit data item.

FIG. 23 is a diagram illustrating another example of the source program 201. In this example, "array0" includes 100 elements and "thread_0" and "thread_1" access only the zeroth to ninth elements. In this case, the zeroth to ninth elements among the elements forming "array0" can be treated as one access unit data item.

A non-sharing target list 206 according to a fourth embodiment includes a description for specifying elements which are treated as the access unit data items in the array. For example, the non-sharing target list 206 includes a description "array0 [i] i=0, 10".

Similarly to the non-sharing process for the entire array, the non-sharing process for a portion of the array can be described by various kinds of schemes, such as an API scheme, a compiler pragma scheme, a scheme which makes an object have non-shared information, a pointer scheme, and a variable scheme.

As such, according to the fourth embodiment, data forming an array or a structure is treated as one access unit data item. Therefore, the size of the non-sharing target list 206 can be reduced. As a result, the RAM 2 can be effectively used to generate a converted program 203.

In the above-described embodiments, the program converting apparatus 100 includes the access attribute determining unit 102, the non-sharing target classifying unit 103, and the converting unit 104. However, two or more of the components may be integrated, one of the components may be divided, or the execution order of some of the components may be changed.

For example, first, the non-sharing target classifying unit 103 calculates the exclusive accesses among the memory accesses performed by the threads forming the source program 201 based on the analysis result information 204 or the profile information 202 output by the analyzing unit 101 and determines an access unit data item, which is a non-sharing process target, among the access unit data items for which the calculated exclusive accesses are performed. The non-sharing target classifying unit 103 may determine all of the access unit data items which are exclusively accessed to be the non-sharing process target or it may determine only the access unit data item which involves a writing process and is exclusively accessed to be the non-sharing process target. In addition, the non-sharing target classifying unit 103 may select the non-sharing process target from the access unit data items which are exclusively accessed, based on performance evaluation. The non-sharing target classifying unit 103 describes the access unit data item which is determined to be the non-sharing process target in the non-sharing target list 206 and outputs the non-sharing target list 206.

Then, the access attribute determining unit 102 determines memory accesses set to the Private attribute among the memory accesses to the access unit data items, which are non-sharing targets, based on performance evaluation, with reference to the non-sharing target list 206. Then, the access attribute determining unit 102 determines the other memory accesses to have the Public attribute. The access attribute determining unit 102 describes the determination result of the access attribute in the access attribute information 205 and outputs the access attribute information 205.

Similarly to the first to fourth embodiments, the converting unit 104 inserts various kinds of processes into the source program 201 based on the access attribute information 205 and the non-sharing target list 206 and outputs a converted program 203.

As described above, according to the first to fourth embodiments, it is determined whether or not to share an access unit data item with other access unit data items based on whether there is at least a writing-back process, and a non-sharing process is inserted into the source program 201 based on the determination result. Therefore, a program can be converted such that cache memories can be effectively used in a multi-processor environment in which processor cores include the cache memories.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A program converting apparatus comprising:
an access attribute determining unit that determines a memory access using a cache memory among exclusive memory accesses by threads forming a source program that is executed in a multi-processor environment including a plurality of processor cores each having the cache memory;
a non-sharing target classifying unit that determines an access data item that does not share a cache line with an arbitrary access data item among the access data items that are accessed using the cache memories; and
a converting unit that inserts a process that uses the cache memory based on the determination result of the access attribute determining unit and a process that does not share the cache line based on the determination result of the non-sharing target classifying unit into the source program, and outputs the source program.

2. The program converting apparatus according to claim 1, further comprising:
an analyzing unit that generates, by analyzing the source program before inserting the processes, a first list in which a pair of the thread and the access data item for each memory access is described and a second list in which a set of the threads that are executed in parallel is described,
wherein the access attribute determining unit calculates the exclusive memory accesses based on the first and second lists.

3. The program converting apparatus according to claim 1, wherein the access attribute determining unit evaluates performance of the exclusive memory accesses both when the cache memory is used and when the cache memory is not used and determines the memory access using the cache memory among the exclusive memory accesses based on the evaluation result.

4. The program converting apparatus according to claim 1, wherein the non-sharing target classifying unit determines all of the access data items that are accessed using the cache memories not to share the cache line with an arbitrary access data item.

5. The program converting apparatus according to claim 2, wherein the analyzing unit describes an access type of each memory access in the first list, and
the non-sharing target classifying unit extracts a first access data item that is accessed by the threads that are executed in parallel using the cache memory and a second access data item that is written by the threads that are executed in parallel without using the cache memory or that is accessed by the threads that are executed in parallel using the cache memory, based on the first and second lists and the determination result of the access attribute determining unit, and the analyzing unit determines the first access data item to be the access item that does not share the cache line with the second access data item.

6. The program converting apparatus according to claim 1, wherein the access attribute determining unit determines access attributes including a first access attribute that defines use of the cache memory and a second access attribute that defines non-use of the cache memory for each memory access, and
the non-sharing target classifying unit extracts the access data items that have the same combination of the thread performing a memory access and the access attribute determined for the corresponding memory access for each thread, and excludes a combination of the extracted access data items from a combination of the access data items that does not share the cache line with each other.

7. The program converting apparatus according to claim 2, wherein the analyzing unit describes an access type of each memory access in the first list, and
the non-sharing target classifying unit determines that the access data item that is subjected to a writing process among the access data items that are accessed using the cache memories does not share the cache line with all of the access data items, based on the first list and the determination result of the access attribute determining unit.

8. The program converting apparatus according to claim 2, wherein the analyzing unit describes an access type of each memory access in the first list, and
the non-sharing target classifying unit extracts a first access data item that is written by the threads that are executed in parallel using the cache memory and a second access data item that is written by the threads that are executed in parallel using the cache memory or without using the cache memory, based on the first and second lists and the determination result of the access attribute determining unit, and the analyzing unit determines the first access data item to be the access item that does not share the cache line with the second access data item.

9. A computer-implemented method comprising:
determining a memory access using a cache memory among exclusive memory accesses by threads forming a source program that is executed in a multi-processor environment including a plurality of processor cores each having the cache memory;
determining an access data item that does not share a cache line with an arbitrary access data item among the access data items that are accessed using the cache memories; and
inserting a process that uses the cache memory based on the result of the determination of the memory access using the cache memory and a process that does not share the cache line based on the result of the determination of the access data item that does not share the cache line into the source program and outputs the source program having the processes inserted thereinto.

10. The computer-implemented method according to claim 9, further comprising:
generating, by analyzing the source program before inserting the processes, a first list in which a pair of the thread and the access data item for each memory access is described and a second list in which a set of the threads that are executed in parallel is described,
wherein the exclusive memory accesses are calculated based on the first and second lists.

11. The computer-implemented method according to claim 9, further comprising:
evaluating performance of the exclusive memory accesses both when the cache memory is used and when the cache memory is not used,
wherein the memory access using the cache memory among the exclusive memory accesses is determined based on the evaluation result of the performance.

12. The computer-implemented method according to claim 9,
wherein all of the access data items that are determined to be accessed using the cache memories are determined not to share the cache line with an arbitrary access data item.

13. The computer-implemented method according to claim 10,
wherein an access type of each memory access is further described in the first list,
a first access data item that is accessed by the threads that are executed in parallel using the cache memory and a second access data item that is written by the threads that are executed in parallel without using the cache memory or that is accessed by the threads that are executed in parallel using the cache memory are extracted based on the first and second lists and the result of the determination of the memory access using the cache memory, and
the first access data item is determined to be the access item that does not share the cache line with the second access data item.

14. The computer-implemented method according to claim 10,
wherein access attributes including a first access attribute that defines use of the cache memory and a second access attribute that defines non-use of the cache memory are determined for each memory access,
the access data items that have the same combination of the thread performing the memory access and the access attribute determined for the corresponding memory access for each thread are extracted, and
a combination of the extracted access data items is excluded from a combination of the access data items that does not share the cache line with each other.

15. The computer-implemented method according to claim 10,
wherein an access type of each memory access is further described in the first list, and
the access data item that is subjected to a writing process among the access data items that are accessed using the cache memories is determined not to share the cache line with all of the access data items, based on the first list and the result of the determination of the memory access using the cache memory.

16. The computer-implemented method according to claim 10,
wherein an access type of each memory access is further described in the first list,
a first access data item that is written by the threads that are executed in parallel using the cache memory and a second access data item that is written by the threads that are executed in parallel using the cache memory or without using the cache memory are extracted based on the first and second lists and the result of the determination of the memory access using the cache memory, and
the first access data item is determined to be the access data item that does not share the cache line with the second access data item.

17. The computer-implemented method according to claim 10,
wherein a set of the threads that are executed in parallel in the same period separated by a synchronization process is described in the second list for each of the periods separated by the synchronization process.

18. A non-transitory computer readable medium comprising instructions that cause a computer to perform:
determining a memory access using a cache memory among exclusive memory accesses by threads forming a source program that is executed in a multi-processor environment including a plurality of processor cores each having the cache memory;
determining an access data item that does not share a cache line with an arbitrary access data item among the access data items that are accessed using the cache memories; and
inserting a process that uses the cache memory, based on the result of the determination of the memory access using the cache memory and a process that does not share the cache line, based on the result of the determination of the access data item that does not share the cache line, into the source program and outputs the source program having the processes inserted thereinto.

19. The non-transitory computer readable medium according to claim 18,
wherein the instructions further cause the computer to perform:
generating, by analyzing the source program before inserting the processes, a first list in which a pair of the thread and the access data for each memory access is described and a second list in which a set of the threads that are executed in parallel is described; and
calculating the exclusive memory accesses based on the first and second lists.

20. The non-transitory computer readable medium according to claim 18,
wherein the instructions further cause the computer to perform:
evaluating performance of the exclusive memory accesses both when the cache memory is used and when the cache memory is not used; and
determining the memory access using the cache memory among the exclusive memory accesses, based on the evaluation result.

* * * * *